(12) United States Patent
Kumar et al.

(10) Patent No.: US 12,406,219 B1
(45) Date of Patent: Sep. 2, 2025

(54) SYSTEMS AND METHODS FOR AUTOMATING A DELIVERY STATION

(71) Applicant: Amazon Technologies, Inc., Seattle, WA (US)

(72) Inventors: FNU Shashank Kumar, Bellevue, WA (US); Shivani Saklani, Issaquah, WA (US); Vishal Dipak Nathu, Franklin, KY (US); Jeffrey Ken Smith, Fallatin, TN (US)

(73) Assignee: Amazon Technologies, Inc., Seattle, WA (US)

( * ) Notice: Subject to any disclaimer, the term of this patent is extended or adjusted under 35 U.S.C. 154(b) by 207 days.

(21) Appl. No.: 18/181,245

(22) Filed: Mar. 9, 2023

(51) Int. Cl.
  *G06Q 10/083* (2024.01)
  *G06Q 10/08* (2023.01)
  *G06V 20/52* (2022.01)
  *G08G 1/09* (2006.01)

(52) U.S. Cl.
  CPC ........... *G06Q 10/083* (2013.01); *G06Q 10/08* (2013.01); *G06V 20/52* (2022.01); *G08G 1/09* (2013.01)

(58) Field of Classification Search
  None
  See application file for complete search history.

(56) References Cited

U.S. PATENT DOCUMENTS

| | | | | |
|---|---|---|---|---|
| 10,106,383 B2* | 10/2018 | Shen | ...................... | B66F 7/0625 |
| 10,551,851 B2* | 2/2020 | Yu | ........................... | B60P 3/007 |
| 11,787,633 B2* | 10/2023 | Blotnik | ................ | B65G 1/1378 414/268 |
| 11,816,624 B2* | 11/2023 | Goldberg | ................. | G08G 5/22 |
| 12,060,225 B2* | 8/2024 | Tazume | ............... | G05D 1/0291 |
| 12,134,518 B2* | 11/2024 | Lert, Jr. | ............... | B65G 1/1375 |
| 2016/0236869 A1* | 8/2016 | Kimura | ................ | B65G 1/1378 |

* cited by examiner

*Primary Examiner* — K. Wong
(74) *Attorney, Agent, or Firm* — Eversheds Sutherland (US) LLP

(57) ABSTRACT

Systems and methods are provided for automating a delivery station including a launch pad area in which delivery vehicles are loaded with packages for delivery and a queuing area in which additional vehicles wait to proceed to the launch pad area. Input devices, such as cameras, may be provided in the launch pad area to determine when the delivery vehicles are loaded and conditions are satisfied for the delivery vehicles to exit the delivery station. An indication may be provided to the delivery vehicles (or delivery drivers) to exit the delivery station using an output device, such as a speaker and/or a light-emitting device, for example.

20 Claims, 6 Drawing Sheets

SYSTEMS AND METHODS FOR AUTOMATING A DELIVERY STATION

BACKGROUND

A delivery station may be a facility in a package delivery network in which packages are received, sorted into delivery routes associated with delivery vehicles, and loaded into the delivery vehicles to be dispatched for delivery to their destinations. Packages that are received at the delivery station are processed and stored for subsequent loading onto the delivery vehicles. After all of the packages have been stored, delivery routes for the packages may be generated. A single route may include a set of packages to be loaded into a delivery vehicle for delivery to their final destinations. When the route plan is complete, a picking process may begin. The picking process may involve removing the packages from their storage locations within the delivery station and loading the packages onto a cart. Once the cart is full, the packages may be transported to a staging area of the delivery station. Once all the routes in a given dispatch window are staged, delivery vehicles at the delivery station may be prompted to proceed into a launch pad area. The launch pad area may be a location inside or outside the delivery station where the packages are loaded from the staging area into their respective delivery vehicles. This process is iterated for all dispatch windows until all routes are dispatched from the delivery station. However, this process conventionally involves the use of a human operator to manage the movement of the delivery vehicles within the delivery station, which may result in inefficiencies.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

This disclosure relates to, among other things, systems and methods for automating a delivery station. In particular, a system including, as a non-limiting example, a combination of traffic lights, cameras, a sound system, and one or more controllers may be provided in the delivery station to automate the management of delivery vehicles within the delivery station. In this manner, the automated system may be used to direct waves of delivery vehicles through progressive stages of the delivery station until ultimately the delivery vehicles are dispatched from the delivery station with packages for delivery. For example, a first wave of delivery vehicles may be directed to certain positions at a launch pad area (which may also generally be referred to as a "loading area") of the delivery station such that the delivery vehicles may be loaded with packages for delivery. The system may also indicate to a second wave of vehicles to remain in a queuing area until the first wave of vehicles are loaded with packages and exit the delivery station. At least some of the cameras may be located at the launch pad area and may be used to capture information about the launch pad area. Based on this data, the one or more controllers may determine when the delivery vehicles are loaded and if any relevant conditions are satisfied for the wave of delivery vehicles to exit the delivery station and proceed on the delivery routes. In this manner, a delivery vehicle may progress through these different stages of the delivery station without requiring any human operator within the delivery station to manage the progression of the delivery vehicles. Additionally, in some instances, if the delivery vehicles are autonomous vehicles, the delivery vehicles may progress through the delivery station completely autonomously without requiring any human driver or human operator to facilitate the progression of the delivery vehicle.

Figure 1:
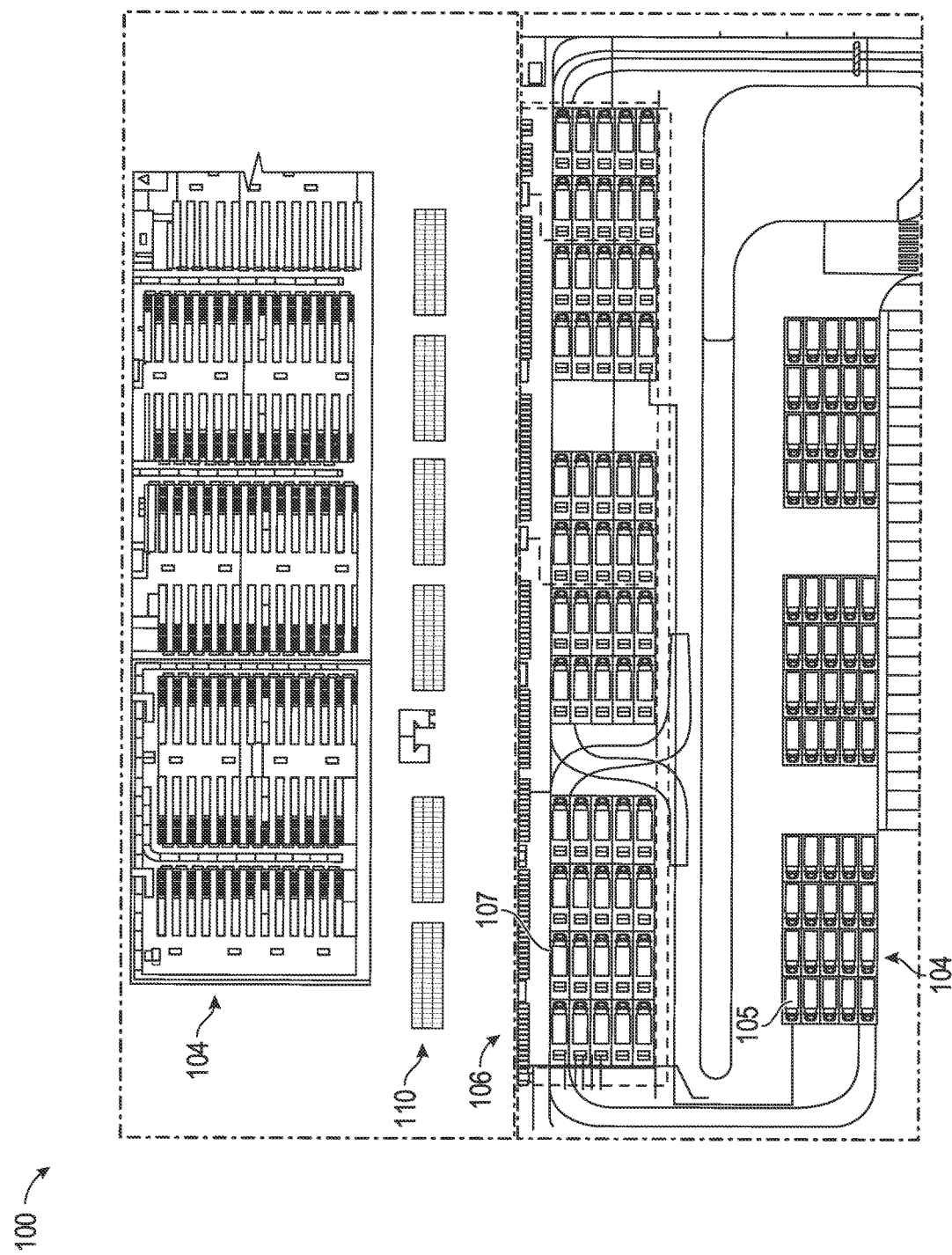
FIG. 1 illustrates an example delivery station, in accordance with one or more example embodiments of the disclosure.

Referring to FIG. 1, an example delivery station 100 is shown, in accordance with one or more example embodiments of the disclosure. In one or more embodiments, the delivery station 100 may include one or more queuing areas 104, one or more launch pad areas 106, and/or one or more package storing areas 104. This depiction of the delivery station 100 is merely intended to illustrate some aspects of the delivery station 100 and is not intended to be limiting. Additionally, for simplicity, reference herein made be made herein to single elements (for example, a "queuing area"), however, this is not intended to be limiting and such language may also similarly refer to any other number of elements in some cases.

The delivery station 100 may be a facility in which various packages for delivery to residential and commercial locations may be stored and subsequently loaded onto delivery vehicles for delivery. Given the volume of packages and delivery vehicles that enter and exit the delivery station in a given day (or any other period of time), it is essential that the processes involved with progressing the delivery vehicles through the delivery station and loading the delivery vehicles with the packages are performed efficiently.

The launch pad area 106 may be a location within the delivery station 100 where one or more delivery vehicles (for example, delivery vehicle 107 and/or any other number of delivery vehicles shown in FIG. 1 or otherwise) are parked (for example, if the delivery vehicle is operated by a human driver) or park (for example, if the delivery vehicle is an autonomous delivery vehicle) to be loaded with packages from the package storing area 104. In some instances, the delivery vehicles may be organized into a number of rows and columns within the launch pad area 106 (for example, as shown in FIG. 1). This provides for a more organized and efficient manner by which the vehicles may be parked within the launch pad area 106, loaded with packages, and directed to exit the delivery station 100 in a particular order (for example, one row of delivery vehicles may exit the delivery station at a time, etc.). However, the delivery vehicles may also be arranged within the launch pad area 106 in any other suitable configuration.

Within the delivery station 100, the delivery drivers, any other human operators, and/or automated equipment (e.g., semiautonomous or autonomous robots, etc.) may remove packages from the one or more package storing areas 104. For simplicity, reference is made to an "associate," however, these same operations may be performed by the automated equipment as well. In some instances, packages may be added to a cart or any other suitable type of apparatus that may be used to transport multiple packages throughout the delivery station 100. Once the packages have been loaded into the cart, the associate may take the cart to a staging area 110 from which the packages may be loaded onto the delivery vehicles parked at the launch pad area 106. This is merely one example of a manner in which the packages may be transported from the one or more package storing areas 104 to the delivery vehicles in the one or more launch pad areas 106 and is not intended to be limiting. The packages may be transported to the staging area 110 after the delivery vehicles have already parked at the launch pad area 106 or before the delivery vehicles have entered the launch pad area 106 as well.

Continuing the above example, an example launch pad area 106 may have five delivery vehicle lanes, and each lane may include a parking space for 12 different delivery vehicles (thus, in this example delivery station, a total of 60 delivery vehicles may be parked in the launch pad area 106 at one time). The driver of a delivery vehicle may park the delivery vehicle in a designated spot within a lane (or an autonomous delivery vehicle may automatically navigate to a designated spot), bring a cart associated with the delivery vehicle from the staging area, load the packages in the delivery vehicle, move the cart out of the launch pad area 106, and wait for an indication to exit the launch pad area 106 and the delivery station to proceed along the delivery route. While reference is made to the delivery driver performing the loading, the loading may similarly be performed by the same associate that transported the packages to the staging area, autonomous equipment, etc.

Given the limited number of delivery vehicles that may be within the launch pad area 106 at a particular time, the queuing area 105 may be used to temporarily hold any delivery vehicles that are awaiting access to the launch pad area 106. For example, a subsequent "wave" of delivery vehicles to be loaded with packages for delivery. Once some or all of the delivery vehicles currently in the launch pad area 106 leave the launch pad area 106 and exit the delivery station 100, an indication may be provided to some or all of the delivery vehicles in the queuing area 105 to proceed to the launch pad area 106. In this manner, multiple waves of delivery vehicles may efficiently progress through the delivery station to be loaded with packages before continuing along a delivery route.

Figure 2:
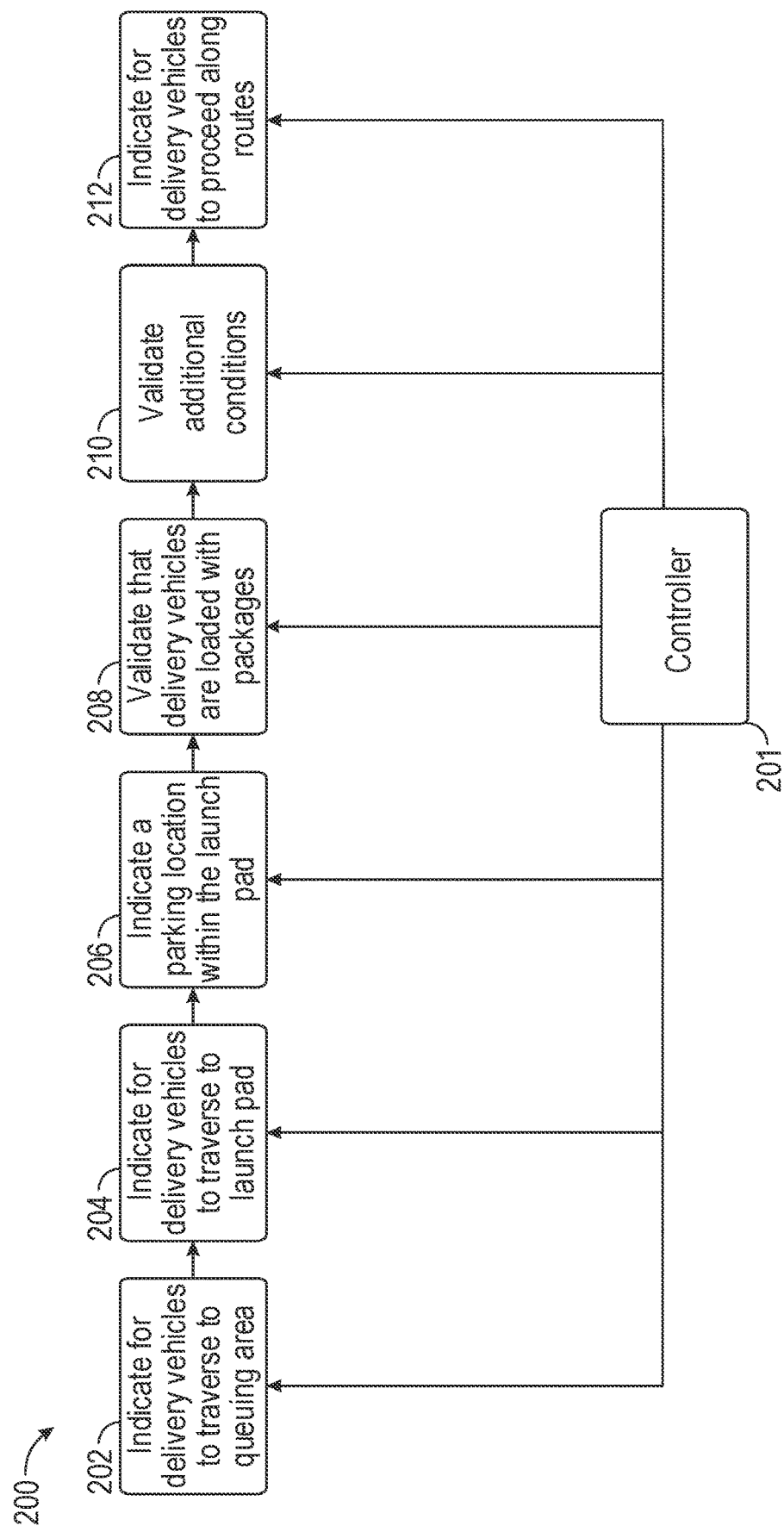
FIG. 2 illustrates an example flow diagram for a progression of a delivery vehicle through a delivery station, in accordance with one or more example embodiments of the disclosure.

FIG. 2 illustrates an example flow diagram 200 for a progression of a delivery vehicle through a delivery station (such as delivery station 100), in accordance with one or more example embodiments of the disclosure. That is, the flow diagram 200 illustrates high-level operations involved as a delivery vehicle progresses through a delivery station before exiting to proceed along a delivery route loaded with packages from the delivery station. The operations of the flow diagram 200 may be facilitated by any system and/or device described herein (for example, controller 201 (which may be the same as, or similar to, controller 306) edge device 420, computing device 600, and/or any other system or device described herein or otherwise).

Operation 202 involves providing an indication to one or more delivery vehicles to traverse to a queuing area (for example, queuing area 105, queuing area 302, etc.). The indication may be provided in any number of different ways. For example, an indication may be provided to an application on a mobile device of the delivery driver. If the delivery vehicle is an autonomous vehicle, the indication may be provided as a communication transmitted to the delivery vehicle itself (for example, a vehicle-to-everything (V2X) communication and/or any other type of communication). As another example, any number of different types of output devices (as described in additional detail in at least FIG. 3), such as traffic lights, display screens, speaker systems, etc. Any other types of more granular instructions may also be provided. For example, a delivery vehicle may be directed to a specific parking spot within the queuing area. As another example, an estimated amount of time until the delivery vehicle may traverse to the launch pad area may also be provided. Reference made herein to providing an indication to a delivery vehicle or user is not intended to be limiting and may also involve providing the indication in any other manner mentioned above or otherwise.

Operation 204 involves providing an indication to the delivery vehicle to traverse from the queuing area to the launch pad area (for example, through the mobile device application, output devices, etc.). Operation 206 involves indicating a specific location within the launch pad area where the delivery vehicle may park. For example, as aforementioned, as a subsequent wave of delivery vehicles enters the launch pad area, the vehicles may be directed to form organized rows and columns of delivery vehicles. Operation 206 may also involve providing instructions to a delivery driver regarding packages to load into the delivery vehicle. For example, an indication of a cart that includes the packages to be loaded onto the delivery vehicle may be provided to the delivery driver.

In some instances, the mobile device application and/or any other output device may also indicate to the delivery driver when to exit the delivery vehicle to retrieve the packages and begin loading the delivery vehicle. For example, to improve the efficiency of the process, the automated system may wait for all (or a particular subset of) the delivery vehicles park within the launch pad area. Once the delivery vehicles are parked, an indication may be provided to the delivery driver through the mobile device application and/or the output devices that the driver may proceed with loading the vehicle. Additional details about the output devices and different ways in which the output devices may provide information are provided with respect to at least FIG. 3.

Operation 208 involves validating that the delivery vehicles in the launch pad area are loaded with packages and ready to proceed on the delivery routes. This validation may be performed in any number of different ways. For example, a delivery driver may manually indicate through the mobile device application when a delivery vehicle has been loaded with any associated packages. As another example, the delivery vehicle may include sensors that are used to automatically detect when the delivery vehicle has been completely loaded with the packages. As yet another example, the input devices (for example, cameras) provided within the delivery station may obtain images and/or video feeds of the launch pad area and this information may be used to identify when delivery vehicles are loaded (for example, using computer vision techniques).

Operation 210 involves validating any other number of conditions before providing an indication for the delivery vehicles to exit the launch pad area and the delivery station. For example, the delivery vehicles and/or the input devices in the delivery station may detect that there are no human operators located in the launch pad area outside of a delivery vehicle. As another example, weather conditions may be assessed to determine if the delivery vehicles are able to exit the delivery station and proceed on the delivery routes. Any other types of conditions may also be monitored before indicating to the delivery vehicles to exit the delivery station from the launch pad area. Operation 212 involves indication to the delivery vehicles and/or drivers to exit the delivery station and proceed along individual delivery routes. Following operation 212, an indication may be provided to a subsequent wave of vehicles that were parked in the queuing area to progress into the launch pad area. This process may iterate until all of the waves for a particular day have been completed.

Figure 3:
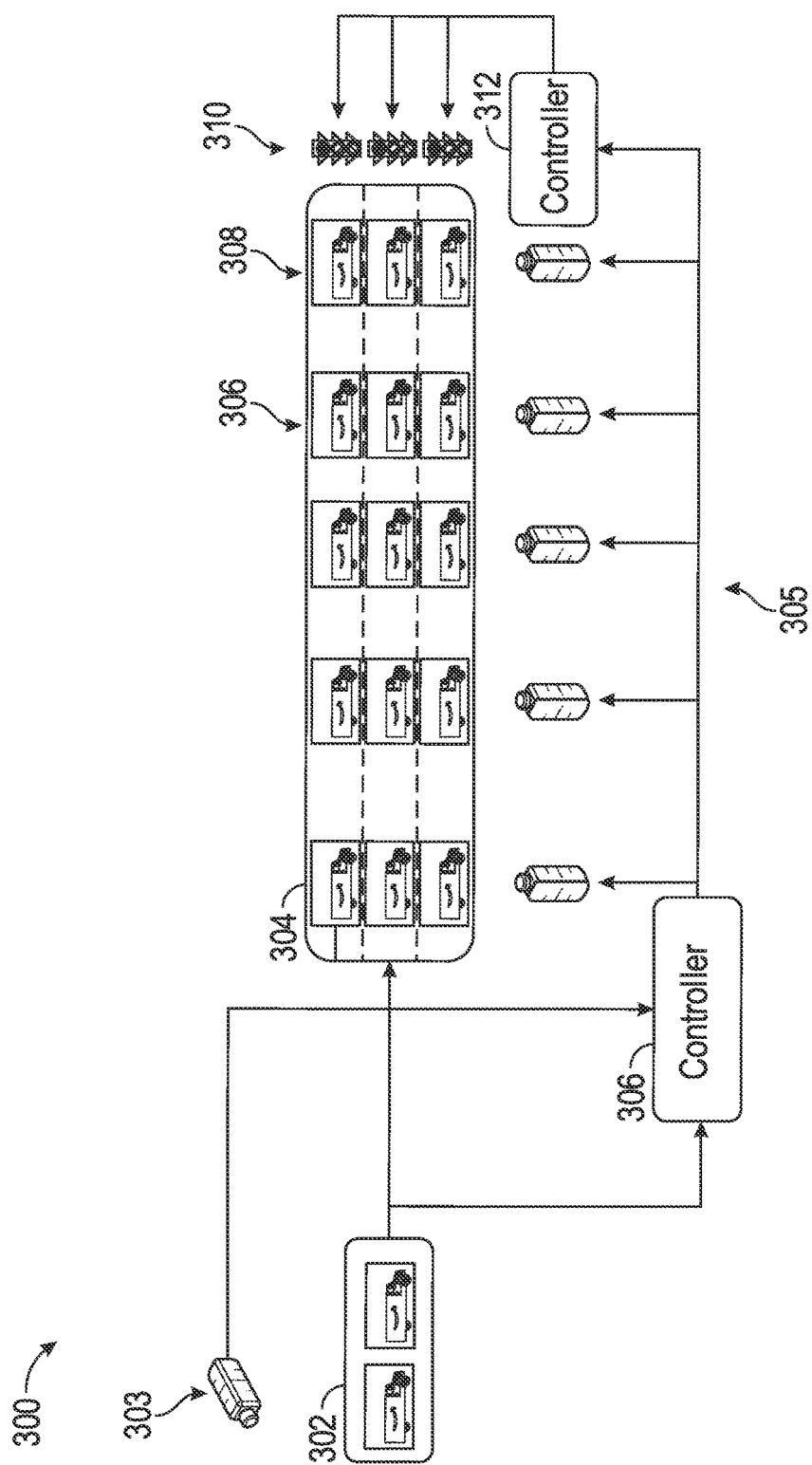
FIG. 3 illustrates an example system for automating progression of a delivery vehicle through a delivery station, in accordance with one or more example embodiments of the disclosure.

FIG. 3 illustrates an example system 300 for automating progression of a delivery vehicle through a delivery station, in accordance with one or more example embodiments of the disclosure. The system 300 may include one or more input devices (such as, for example, one or more first cameras 303 and one or more second cameras 305) and one or more output devices (such as, for example, one or more lights 310). The system may also include a first controller 306, a second controller 312, and/or any other number of controllers. These elements of the system 300 as shown in FIG. 3 are merely exemplary and are not intended to be limiting.

Any of the elements of the system 300 may be provided within or outside of the delivery station. For example, the delivery station may include a launch pad area 304 and a queuing area 302. The launch pad area 304 may be the area within the delivery station where delivery vehicles (for example, delivery vehicle 306, delivery vehicle 308, and/or any other number of delivery vehicles) are parked and loaded with packages for delivery. The queuing area 302 may be an area prior to the launch pad area 304 where delivery vehicles queue when the launch pad area 304 is full. Once the delivery vehicles at the launch pad area 304 are loaded and exit the delivery station, a subsequent group of delivery vehicles may traverse from the queuing area 302 to the launch pad area 304.

The one or more inputs devices may be used to capture information relating to these different areas within or outside of the delivery station in which vehicles may be located (for example, the queuing area 302, the launch pad area 304, etc.). In the example provided in FIG. 3, the one or more first cameras 303 may be configured to capture information relating to queuing area 302. In some instances, the information may be captured in the form of images and/or a video feed of the one or more first cameras 303. The information may include any number of different types of information that may be relevant to automating the management of the delivery vehicles progressing through the delivery station. For example, the information may include a number of delivery vehicles currently queued in the queueing area 302, identifying information associated with individual delivery vehicles, a number of users located outside of vehicles within the queuing area 302, and/or any other types of information. That is, the information may not necessarily only relate to the delivery vehicles, but may also include, for example, information about objects present within the different areas of the delivery station, as well as any other types of information.

The one or more second cameras 305 may likewise be configured to capture information relating to the launch pad area 304. In some instances, this information may also be in the form of images and/or video feed from the one or more second cameras 305. Similar to the information captured by the one or more first cameras 303, this information may include information relating to the delivery vehicles located in the queuing area in addition to information not relating to the delivery vehicles. For example, the information may include a number of delivery vehicles currently parked in the launch pad 304, identifying information associated with individual delivery vehicles, a number of users located outside of vehicles within the launch pad 304, a loading status of the delivery vehicles (for example, whether certain delivery vehicles have been loaded and are ready to proceed along a delivery route), and/or any other types of information.

Although the figure only shows one camera provided proximate to the queuing area 302 and five cameras provided proximate to the launch pad area 304 (with one camera being provided for each "row" of delivery vehicles), this is not intended to be limiting. Any number of cameras may also be provided at the queuing area 302, the launch pad area 304, and/or any other area within or outside of to the delivery station. Additionally, the cameras may be provided in any number of different configurations, including various positions, angles, etc. relative to the areas within or proximate to the delivery station and the delivery vehicles.

In some instances, the cameras may be positioned such that the combination of all of the cameras capture the entirety of a particular area of the delivery station. For example, the one or more second cameras 305 may be provided in a configuration such that all of the launch pad area 304 is captured through the images and/or video feed produced by the one or more second cameras 305. This may include positioning certain cameras at heights that allow the cameras to view space between delivery vehicles. As one example, the cameras may be positioned to capture top-down views of delivery vehicles. As another example, this may include positioning certain cameras at lower heights such that they are able to view underneath the delivery vehicles. In this manner, the configuration of the cameras may ensure that "blind spots" do not exist within the particular area. These are just a few non-limiting examples of manners in which the cameras may be positioned to maximize the views of the area captured by the cameras.

Additionally, the one or more input devices may also include any other type of device other than cameras as well. For example, various types of sensors may be provided in the system 300. Infrared sensors, proximity sensors, and the like may be used to detect the location of delivery vehicles within or outside of the delivery station. For example, individual infrared sensors may be provided in association with individual parking locations within an area (such as the launch pad area 306). These sensors may be used to detect which spaces within the area are occupied by a delivery vehicle to assist in the management of directing delivery vehicles to the area and/or specific parking positions within the area. These sensors may also be used to capture any other types of information, such as the number of delivery vehicles currently parked in the area. Pressure sensors may be used to determine when a delivery vehicle traverses into a location (for example, pressure sensors may be provided underneath the launch pad area 306 and may detect when a delivery vehicle drives onto the launch pad area 306. Radar and lidar devices may also be used. These sensors may also generally be referred to as "parking sensors." Any other types of sensors and/or combination of sensors may be provided within or outside the delivery station to capture information about the areas within the delivery station, the delivery vehicles, etc. The additional types of input devices may also be provided in combination with the cameras.

In one or more embodiments, the system 300 may also leverage cameras (and/or any other types of input devices) provided on or within a delivery vehicle to obtain additional information about the area in which the delivery vehicle is located. For example, a delivery vehicle may be provided with one or more cameras within the interior of the vehicle or on the exterior of the vehicle (e.g., back-up cameras, dash cameras, and/or any other types of cameras). A delivery vehicle may also be provided with sensors that may be used to provide certain advanced driver assist system (ADAS) functionality of the delivery vehicles, such as lane-assist, cruise control, etc. A delivery vehicle may also be provided with sensors to allow the vehicle to perform autonomous navigation. A delivery vehicle may also be provided with sensors for any other purpose. This information may be used for any number of purposes, such as determining a current location of individual delivery vehicles (e.g., a video feed from a camera of one delivery vehicle may be used to determine that the particular delivery vehicle is currently driving to the launch pad area 304), further reducing the number of potential blind spots within an area of the delivery station (for example, a camera on a delivery vehicle may capture an angle within the launch pad area 304 that the one or more second cameras 305 may not be able to capture), etc. These input devices of the delivery vehicles may also be used to capture any other types of information.

In one or more embodiments, the controller 306 (which may be similar to the edge device 420) may receive the information captured by any of the aforementioned input devices, such as the one or more first cameras 303, one or more second cameras 304, the delivery vehicles, etc. The controller 306 may also receive information from other devices and system, such as user mobile devices, etc.

The controller 306 may process any of this received information to determine when to indicate to the delivery vehicles in the queuing area 302 and/or the launch pad 304 to progress through the delivery station to a subsequent area. For example, the controller 306 may determine when to indicate to the delivery vehicles at the launch pad 304 to leave the launch pad 304 and the delivery station and proceed to navigate delivery routes. As another example, the controller 306 may determine when to indicate to the delivery vehicles at the queuing area 302 to traverse forward to the launch pad area 304 to be loaded with packages.

In one or more embodiments, the controller 306 may determine that an indication may be provided to the delivery vehicles in the launch pad area 304 to proceed out of the launch pad area 304 when the delivery vehicles are loaded with any assigned packages. In some instances, the controller 306 may specifically determine whether all of the delivery vehicles are loaded with packages and ready to proceed along the delivery routes. The controller 306 may make this determination based on any number of different types of information. For example, the controller 306 may use any number of different types of computer vision algorithms to detect when the delivery vehicles are loaded with packages based on the images and/or video feed from the one or more second cameras 305 and/or any other input devices. As another example, the controller 306 may receive manual indications from delivery drivers that individual delivery vehicles have been loaded with packages and are ready to proceed. For example, the delivery driver may provide an indication that they have loaded a delivery vehicle and are ready to proceed through a mobile device application.

In one or more embodiments, the delivery vehicles themselves may also provide an indication that the delivery vehicles are loaded with packages to the controller 306 without requiring manual user input. For example, a delivery vehicle may store information about the packages that are assigned to the delivery vehicle. As packages are loaded into the delivery vehicle, the delivery vehicle may use any input devices (cameras, sensors, etc.) to determine which packages have been loaded into the vehicle. As one non-limiting example, the packages may include barcodes and the delivery vehicle may use a camera to scan the barcodes as the packages are loaded into the delivery vehicle (however, the identification of the packages may also be performed in any other suitable manner). Once the delivery vehicle determines that all of the packages have been loaded onto the delivery vehicle, a signal may automatically be transmitted by the delivery vehicle to the controller 306 indicating that all of the packages have been loaded. The delivery vehicle may also use any input devices to assess other conditions, such as whether the doors of the delivery vehicle have been properly shut. This information may also be provided to the controller 306 by the delivery vehicle.

In addition to determining whether all of the delivery vehicles have been loaded with corresponding packages for delivery, the controller 306 may also assess any other number of conditions before determining that an indication should be provided to the delivery vehicles to exit the launch pad area 304. For example, the controller 306 may process the information from the one or more input devices to determine if there are any objects outside of delivery vehicles within the launch pad area 304 (e.g., packages left within the launch pad area 304 instead of being loaded onto a vehicle, carts remaining within the launch pad area 304, humans within the launch pad area 304, and/or any other types of possible objects). The controller 306 may also determine if any humans are still within the launch pad are 304 that are not situated within a delivery vehicle (for example, a delivery driver standing or walking within the launch pad area 304, etc.).

The controller 306 may also identify any issues with delivery vehicles within the launch pad area 304, such as doors of delivery vehicles that were not shut, etc. The controller 306 may also assess any other number of conditions as well. If it is determined that doors of a delivery vehicle are opened, the controller 306 may send a signal to the delivery vehicle that causes the delivery vehicle to automatically close the door. Likewise, a signal may be provided through any output device to indicate to a delivery driver of the delivery vehicle to close the door.

After performing this processing, the controller 306 may cause one or more output devices of the delivery station to direct the delivery vehicles (that is, the indications to the delivery vehicles may be provided by the output devices). For example, one or more lights 310 may be provided at various positions within the launch pad area 304. For example, the launch pad area 304 may be separated into rows of vehicles and a light may be provided at individual rows. The lights 310 may be provided at a height such that the lights 310 may be visible by delivery vehicles and/or drivers at a back end of the launch pad area 304. The one or more lights 310 may also be provided in any other configuration. For example, the one or more lights 310 may also be provided for individual delivery vehicles or only a single light may exist to provide indications to all delivery vehicles at the launch pad area 304.

In one or more embodiments, the one or more lights 310 may specifically be controlled by the controller 312. That is, as shown in FIG. 3, the system 300 may include controller 306 and controller 312. Controller 306 may be an edge device that may perform some or all of the analysis of the input information obtained from the one or more input devices. Controller 312, however, may be a microcontroller (or other type of computing device) that is configured to provide control instructions to the one or more output devices based on the processing performed by the controller 306. However, this configuration is not intended to be limiting and, in some embodiments, the controller 306 may simply provide control instructions directly to the one or more output devices.

The one or more lights 310 may include one or more light emitting diodes (LEDs), for example, and may be configured to present different types of indications based on control signals received from the controller 312. For example, the controller 306 may indicate to the one or more lights 310 to present a first color to indicate to the delivery vehicle and/or driver to keep the delivery vehicle stationary. The controller 306 may also indicate to the one or more lights 310 to present a second color to indicate to the delivery vehicle and/or driver to proceed forward (for example, traverse from the queuing area 302 to the launch pad area 304, exit the delivery station, etc. The controller 312 may be configured to provide these control signals based on outputs provided by the controller 306 based on processing of any information captured by the one or more input devices.

Additionally, the one or more output devices may not necessarily be limited to lights 310 as shown in the figure. For example, one or more displays may also be provided at the queuing area 302, launch pad area 304, and/or any other location. The displays may include any number of different types of displays, such as a liquid crystal display (LCD), LED, QLED, OLED, etc. In some instances, the one or more displays may be configured to present similar types of indications as the one or more lights 310. However, the one or more displays may also be configured to present more detailed information, such as images and/or text providing additional guidance to the delivery vehicles and/or drivers. For example, the display may indicate that a first group of vehicles may proceed to exit the launch pad area 304, followed by a second group of vehicles, etc.

The one or more output devices may also include mobile devices (for example, mobile device 402), devices provided within any delivery vehicles (for example, a tablet or other type of device may be provided in a delivery vehicle), and/or any other types of devices. Any other types of output devices and/or combination of types of output devices may also be provided.

The one or more displays may also provide any other information. As an additional example, the one or more displays may be used to provide an indication as to why the delivery vehicles are not being instructed to exit a given area of the delivery station. For example, the one or more displays may indicate that specific vehicles have or have not been loaded with packages yet, that users are still outside of vehicles within the launch pad area 304 and/or any other types of information.

Furthermore, the type of output may not necessarily be limited to visual outputs. For example, auditory outputs may also be provided to the delivery vehicles and/or drivers. To this end, audio devices, such as one or more speakers may be provided within the queuing area 302, launch pad area 304, and/or any other location associated with the delivery station. Different auditory outputs may be provided in combination with, or alternatively to, the visual indications provided by the one or more lights 310 or any other types of output devices that are provided. Any of these different output devices (and any of the inputs devices) may be used separately or in any combination with one another.

Figure 4:
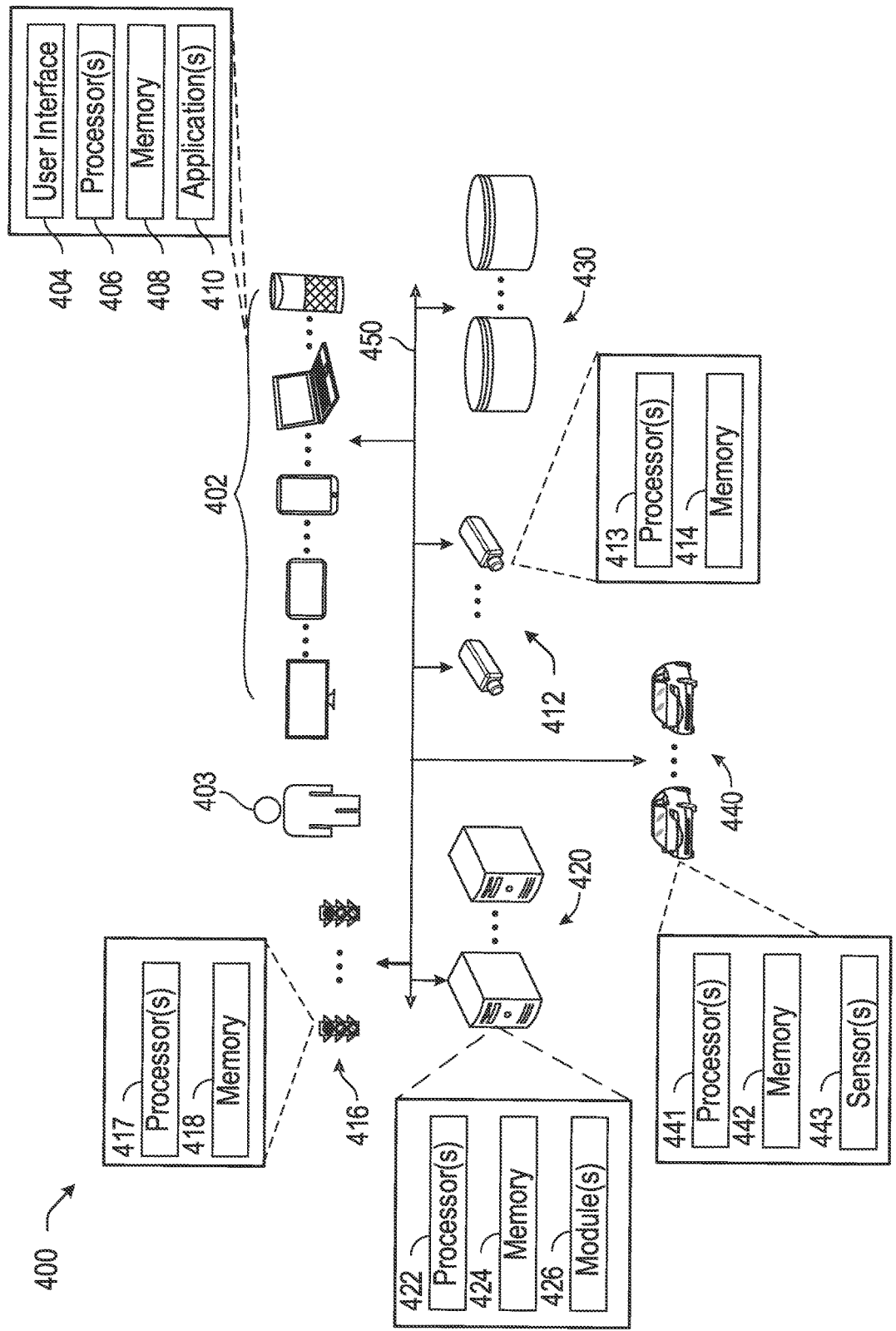
FIG. 4 illustrates another example system for automating progression of a delivery vehicle through a delivery station, in accordance with one or more example embodiments of the disclosure.

FIG. 4 illustrates another example system 400, in accordance with one or more example embodiments of the disclosure. In one or more embodiments, the system may include one or more mobile devices 402 (which may be associated with one or more users 403), one or more input devices 412, one or more output devices 416, one or more computing devices 420, one or more databases 430, and/or one or more delivery vehicles 440. However, these components of the system 400 are merely exemplary and are not intended to be limiting in any way. For simplicity, reference may be made hereinafter to a mobile device 402, input device 412, output device 416, computing device 420, database 430, delivery vehicle 440, etc., however, this is not intended to be limiting and may still refer to any number of such elements.

The mobile device 402 may be any type of device, such as a smartphone, desktop computer, laptop computer, tablet, and/or any other type of device. The mobile device 402 may include an application 410 that may allow a user 403 (a user 403 may be a delivery driver, for example) to perform certain functions described herein. For example, the user 403 may be able to view information about packages assigned to a delivery vehicle of the user 403 such that the user 403 may then load a delivery vehicle with the correct packages in the launch pad area 304. The user 403 may also be able to view any other types of information, such as route information. In some instances, the mobile device 402 may serve as an output device 416 and indications of instructions for the user 403 to drive the delivery vehicle to progress through the delivery station may be provided through the application 410. For example, the application 410 may present an indication for the user 403 to drive the delivery vehicle from the queuing area 302 to the launch pad area 304. The user 403 may be able to interact with the application 410 through a user interface 404 of the mobile device 402. The mobile device 402 may also include processor(s) 406 and memory 408.

The input device 412 (which may be similar to the one or more input devices of FIG. 3) may include any number of different types of devices that are used to capture information about areas within or outside of the delivery station. For example, the input device 412 may include a camera used to capture images and/or video feed of different locations within the delivery station (such as the queuing area 302, the launch pad area 304, etc.). The input device 412 may also include any other types of devices that may be used to capture information, such proximity sensors, infrared sensors, pressure sensors located underneath the delivery station, and/or any other types of sensors. The input device 412 may also include microphones and/or any other types of devices configured to capture auditory information as well.

The output device 416 may be any number of different types of devices used to provide instructions to the delivery vehicle 440, the mobile device 402, the user 403, etc. For example, the output device 416 may include a traffic light (as shown in FIG. 4), any other type of light-emitting device that is configured to emit different colors to provide different types of instructions to the delivery vehicle 440. As another example, the output device 416 may include a display screen that is configured to provide more granular information, such as text, images, and/or videos to the delivery vehicles 440 and/or the user 403. The output device 416 may also include a device capable of providing an auditory indication to a user 403 or a delivery vehicle 420, such as a speaker. The output device 416 may also include any other type of device.

The computing device 420 may be any type of device or system used to perform any of the processing described herein for example, the computing device may be the controller 306, controller 312, etc. The computing device 420 may also include one or more processors 422 and memory 424. Any of this processing may also be performed by the mobile device 402 and/or any other device or system described herein as well.

The database 430 may store any of the data that is used as described herein. For example, the database 430 may store information about packages and routes assigned to particular vehicles, users 403 associated with individual delivery vehicles 440, and/or any other relevant information.

The delivery vehicle 440 may be a vehicle that is configured to receive a number of packages from the delivery station for delivery to destinations of the packages along a delivery route. For example, the delivery vehicle 440 may be a van, car, truck, and/or any other type of vehicle. In one or more embodiments, the delivery vehicle 440 may also include semi-autonomous or autonomous capabilities such that the delivery vehicle 440 may progress through the delivery station without requiring the user 403 to drive the delivery vehicle 440. Rather, the delivery 440 vehicle may autonomously navigate the delivery station and/or perform other functions, such as automatically loading itself using an autonomous robot based on instructions from the computing device 420. The delivery vehicle 440 may also be configured to progress through the delivery station 440 partially or fully using its own processor(s) 441 and memory 442 rather than relying on instructions from the computing device 420 as well.

The delivery vehicle 440 may also be equipped with any number of sensors 443 that may also be used as input devices to capture information and provide such information to the computing device 420. For example, a sensor 443 (which may also include a camera) of the delivery vehicle 440 may be used to capture information about the environment around the delivery vehicle 440. The sensor 443 may also be used to capture information about the delivery vehicle 440 itself and the contents of the delivery vehicle 440. For example, the delivery vehicle 440 may use the sensor 443 to identify packages loaded into the delivery vehicle 440, whether the doors of the delivery vehicle 440 are properly closed, whether the driver 403 is inside the delivery vehicle 440, etc.

In one or more embodiments, any of the elements of the system 400 (for example, one or more mobile devices 402, one or more input devices 412, one or more output devices 416, one or more computing devices 420, one or more databases 430, one or more delivery vehicles 400, and/or any other element described with respect to FIG. 4 or otherwise) may be configured to communicate via a communications network 450. The communications network 450 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 450 may have any suitable communication range associated therewith and may include, for example, global networks (e.g., the Internet), metropolitan area networks (MANs), wide area networks (WANs), local area networks (LANs), or personal area networks (PANs). In addition, communications network 920 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements (for example, one or more mobile devices 402, one or more input devices 412, one or more output devices 416, one or more computing devices 420, one or more databases 430, and/or one or more delivery vehicles 440) of the system 400 may include any of the elements of the computing device 600 as well. For example, FIG. 4 also shows the output device 416 as including processor(s) 417and memory 418 and delivery vehicle 440 also including processor(s) 441 and memory 442.

Figure 5:
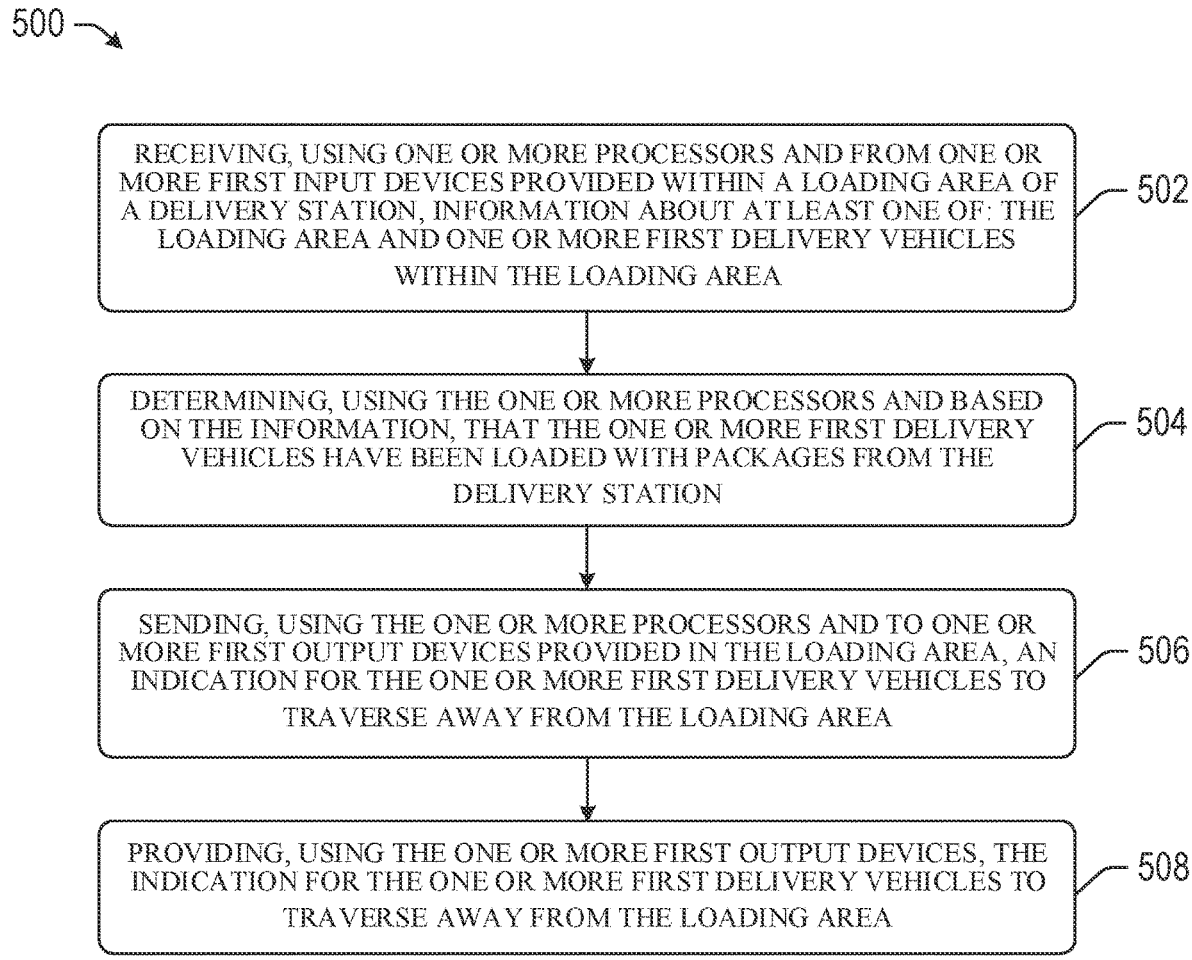
FIG. 5 illustrates an example method for automating progression of a delivery vehicle through a delivery station, in accordance with one or more example embodiments of the disclosure.

FIG. 5 depicts an example process flow 500, in accordance with one or more example embodiments of the disclosure. Some or all of the blocks of the process flows in this disclosure may be performed in a distributed manner across any number of devices or systems (for example, user device 402, computing device 420, controller 306, controller 312, computing device 600, and/or any other type of device, system, etc.). The operations of the process flow 500 may be optional and may be performed in a different order.

At block 502 of the process flow 500, computer-executable instructions stored on the memory of a device may be executed to receive, from one or more first input devices provided within a loading area of a delivery station, information about at least one of: the loading area and one or more first delivery vehicles within the loading area;

At block 504 of the process flow 500, computer-executable instructions stored on the memory of a device may be executed to determine, based on the information, that the one or more first delivery vehicles have been loaded with packages from the delivery station;

At block 506 of the process flow 500, computer-executable instructions stored on the memory of a device may be executed to send, to one or more first output devices provided in the loading area, an indication for the one or more first delivery vehicles to traverse away from the loading area; and At block 508 of the process flow 500, computer-executable instructions stored on the memory of a device may be executed to provide, using the one or more first output devices, the indication for the one or more first delivery vehicles to traverse away from the loading area.

Figure 6:
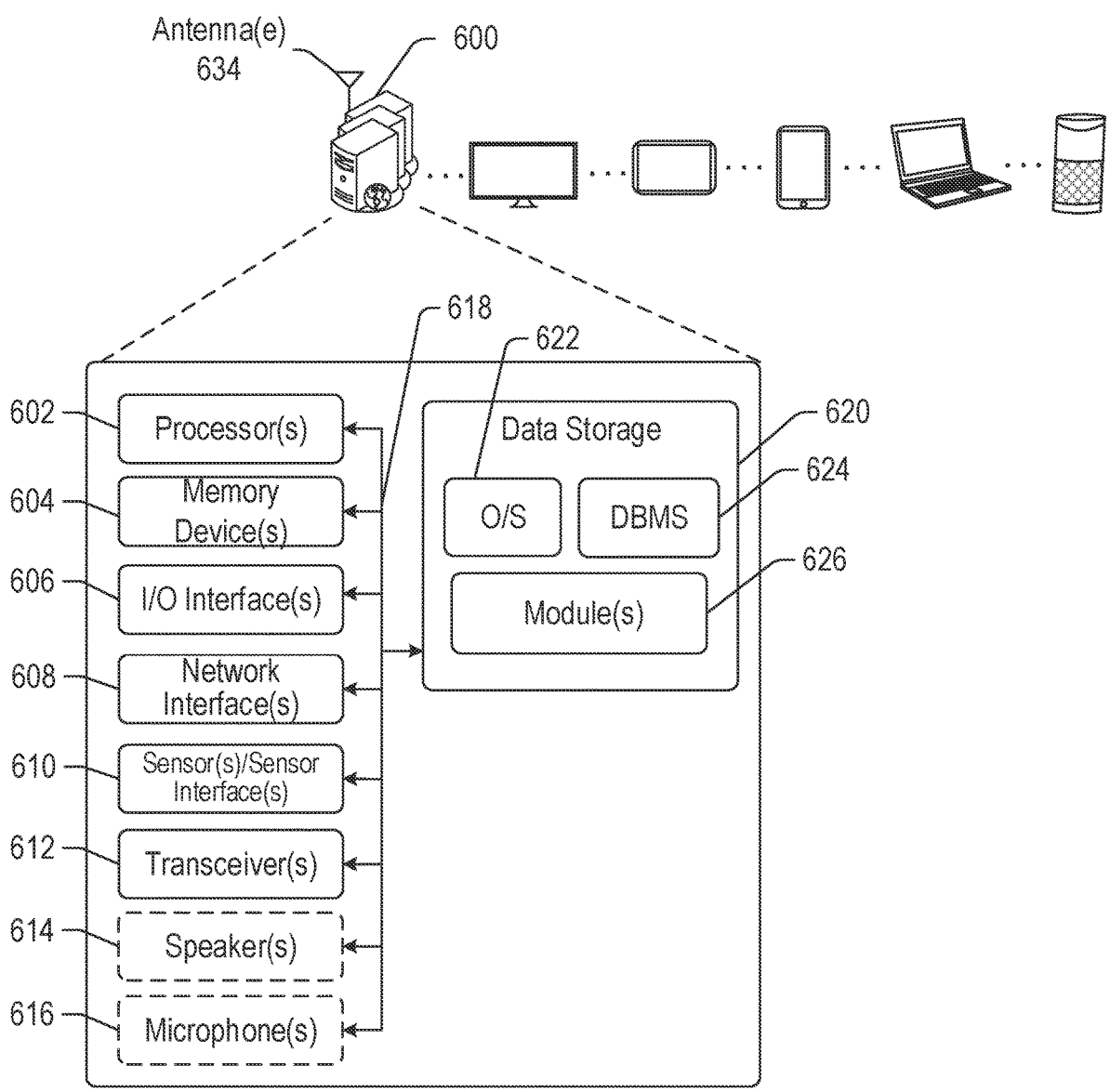
FIG. 6 illustrates an example computing device, in accordance with one or more example embodiments of the disclosure.

FIG. 6 is a schematic block diagram of an illustrative computing device 600, in accordance with one or more example embodiments of the disclosure. The computing device 600 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The computing device 600 may correspond to an illustrative device configuration for the devices (for example, controller 306, controller 312, mobile device 302, computing device 420, one or more input devices and/or output devices of FIGS. 3-4, and/or any other device with processing capabilities).

The computing device 600 may be configured to communicate via one or more networks with one or more servers, search engines, user devices, or the like. In some embodiments, a single remote server or a single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 600 may include one or more processors (processor(s)) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The computing device 600 may further include one or more buses 618 that functionally couple various components of the computing device 600. The computing device 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system buses, the memory bus, an address bus, or a message bus, and may permit exchange of information (e.g., data (including computer-executable code), signaling, etc.) between various components of the computing device 600. The bus(es) 618 may include, without limitation, the memory bus or the memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the computing device 600 may include volatile memory (memory that maintains its state when supplied with power) such as random-access memory (RAM) and/or nonvolatile memory (memory that maintains its state even when not supplied with power) such as read-only memory (ROM), flash memory, ferroelectric RAM (FRAM), and so forth. Persistent data storage, as that term is used herein, may include nonvolatile memory. In certain example embodiments, volatile memory may enable faster read/write access than nonvolatile memory. However, in certain other example embodiments, certain types of nonvolatile memory (e.g., FRAM) may enable faster read/write access than certain types of volatile memory.

In various implementations, the memory 604 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation look-aside buffer(s) (TLBs), and so forth. Further, cache memory such as a data cache may be a multilevel cache organized as a hierarchy of one or more cache levels (L1, L2, etc.).

The data storage 620 may include removable storage and/or nonremovable storage, including, but not limited to, magnetic storage, optical disk storage, and/or tape storage. The data storage 620 may provide nonvolatile storage of computer-executable instructions and other data. The memory 604 and the data storage 620, removable and/or nonremovable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for nonvolatile storage.

More specifically, the data storage 620 may store one or more operating systems (O/S) 622; one or more database management systems (DBMS) 624; and one or more program module(s), applications, engines, computer-executable code, scripts, or the like such as, for example, one or more module(s) 626. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support the functionality described in reference to correspondingly named components earlier in this disclosure.

The data storage 620 may further store various types of data utilized by components of the computing device 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, purchase history information, user action information, user profile information, a database linking search queries and user actions, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the computing device 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the module(s) 626 may include computer-executable instructions, code, or the like that responsive to execution by one or more of the processor(s) 602 may perform any processing described herein or otherwise.

Referring now to other illustrative components depicted as being stored in the data storage 620, the O/S 622 may be loaded from the data storage 620 into the memory 604 and may provide an interface between other application software executing on the computing device 600 and the hardware resources of the computing device 600. More specifically, the O/S 622 may include a set of computer-executable instructions for managing the hardware resources of the computing device 600 and for providing common services to other application programs (e.g., managing memory allocation among various application programs). In certain example embodiments, the O/S 622 may control execution of the other program module(s) to dynamically enhance characters for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 600 is a mobile device, the DBMS 624 may be any suitable light-weight DBMS optimized for performance on a mobile device.

Referring now to other illustrative components of the computing device 600, the input/output (I/O) interface(s) 606 may facilitate the receipt of input information by the computing device 600 from one or more I/O devices as well as the output of information from the computing device 600 to the one or more I/O devices. The I/O devices may include any of a variety of components, such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long-Term Evolution (LTE) network, WiMAX network, 3G network, ZigBee network, etc.

The computing device 600 may further include one or more network interface(s) 608 via which the computing device 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range, forming part of the unlicensed portion of the radio spectrum.

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the computing device 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the computing device 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device, such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the computing device 600 may include alternate and/or additional hardware, software, or firmware components beyond those described or depicted without departing from the scope of the disclosure. More particularly, it should be appreciated that software, firmware, or hardware components depicted as forming part of the computing device 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components, including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by a controller including one or more processors and from one or more cameras provided within a loading area of a delivery station, an indication that one or more prior delivery vehicles have left the loading area;
emitting, by one or more light-emitting devices and to one or more first delivery vehicles within a queuing area of the delivery station, a first light providing an indication for the one or more first delivery vehicles to traverse into the loading area, wherein the first light is visible to delivery drivers within the one or more first delivery vehicles;
receiving, by the controller from the one or more cameras, images and/or videos of the loading area;

providing, by the controller, an indication of one or more packages in the delivery station to be loaded into the one or more first delivery vehicles;

determining, by the controller and based on the images and/or videos of the loading area, that the one or more first delivery vehicles have been loaded with the one or more packages from the delivery station;

determining, by the controller and based on the images and/or videos of the loading area, that all delivery drivers associated with the one or more first delivery vehicles are within the one or more first delivery vehicles;

sending, by the controller and to one or more light-emitting devices provided in the loading area, a signal to indicate for the one or more first delivery vehicles to traverse away from the loading area and proceed along one or more delivery routes to one or more delivery locations external to the delivery station; and emitting, by the one or more light-emitting devices, a second light providing the indication for the one or more first delivery vehicles to traverse away from the loading area.

2. The method of claim 1, wherein determining that the one or more first delivery vehicles have been loaded with packages from the delivery station further comprises:
determining, based on data captured by a sensor of the one or more first delivery vehicles, that a door of the one or more first delivery vehicles has closed.

3. The method of claim 1, wherein determining that the one or more first delivery vehicles have been loaded with packages from the delivery station further comprises:
receiving, from one or more mobile devices associated with one or more delivery drivers of the one or more first delivery vehicles, an indication that the one or more first delivery vehicles have been loaded with packages.

4. The method of claim 1, wherein determining that the one or more first delivery vehicles have been loaded with packages from the delivery station further comprises:
analyzing, by the controller, the images and/or videos using computer vision.

5. A method comprising:
receiving, using one or more processors and from one or more first input devices provided within a loading area of a delivery station, information about at least one of: the loading area and one or more first delivery vehicles within the loading area;

determining, using the one or more processors and based on the information, that the one or more first delivery vehicles have been loaded with packages from the delivery station;

sending, using the one or more processors and to one or more first output devices provided in the loading area, an indication for the one or more first delivery vehicles to traverse away from the loading area; and providing, using the one or more first output devices, the indication for the one or more first delivery vehicles to traverse away from the loading area to perform a delivery at a second location that is external to the delivery station.

6. The method of claim 5, wherein the one or more first input devices include at least one of: cameras configured to capture images and/or video of the loading area, a parking sensing device, radar, and lidar.

7. The method of claim 5, wherein the one or more first output devices include at least one of: a light-emitting device configured to emit a first light to indicate that the one or more first delivery vehicles should remain parked in the loading area and a second light to indicate that the one or more first delivery vehicles should traverse away from the loading area, a speaker, a display screen, and one or more devices provided in the one or more first delivery vehicles.

8. The method of claim 5, wherein the delivery station further comprises a queuing area prior to the loading area, wherein the method further comprises:
determining, using one or more input devices, that the one or more first delivery vehicles are outside of the loading area;

sending, using the one or more processors and to one or more second output devices associated with the queuing area, a signal to indicate for one or more second delivery vehicles in the queuing area to traverse into the loading area from the queuing area; and providing, using the one or more second output devices, the indication for the one or more second delivery vehicles to traverse into the loading area from the queuing area.

9. The method of claim 5, wherein determining that the one or more first delivery vehicles have been loaded with packages from the delivery station further comprises:
determining, based on data captured by a sensor of the one or more first delivery vehicles, that a door of the one or more first delivery vehicles has closed.

10. The method of claim 5, wherein determining that the one or more first delivery vehicles have been loaded with packages from the delivery station further comprises:
receiving, from at least one of one or more mobile devices associated with one or more delivery drivers of the one or more first delivery vehicles and on or more sensors associated with the one or more first delivery vehicles, an indication that the one or more first delivery vehicles have been loaded with packages.

11. The method of claim 5, wherein the one or more first input devices include one or more cameras, and wherein determining that the one or more first delivery vehicles have been loaded with packages from the delivery station further comprises:
analyzing, using the one or more processors, the information using computer vision.

12. The method of claim 5, wherein sending the indication for the one or more first delivery vehicles to traverse away from the loading area is further based on determining, based on the information, that the loading area does not include any humans outside of the one or more first delivery vehicles.

13. A system comprising:
non-transitory memory that stores computer-executable instructions; and
one or more processors configured to access the memory and execute the computer-executable instructions to:
receive, from one or more first input devices provided within a loading area of a delivery station, information about at least one of: the loading area and one or more first delivery vehicles within the loading area;
determine, based on the information, that the one or more first delivery vehicles have been loaded with packages from the delivery station;
send, to one or more first output devices provided in the loading area, an indication for the one or more first delivery vehicles to traverse away from the loading area; and
provide, using the one or more first output devices, the indication for the one or more first delivery vehicles to traverse away from the loading area to perform a delivery at a second location that is external to the delivery station.

14. The system of claim 13, wherein the one or more first input devices include at least one of: cameras configured to capture images and/or video of the loading area, a parking sensing device, radar, and lidar.

15. The system of claim 13, wherein the one or more first output devices include at least one of: a light-emitting device configured to emit a first light to indicate that the one or more first delivery vehicles should remain parked in the loading area and a second light to indicate that the one or more first delivery vehicles should traverse away from the loading area, a speaker, a display screen, and one or more devices provided in the one or more first delivery vehicles.

16. The system of claim 13, wherein the delivery station further comprises a queuing area prior to the loading area, wherein the one or more processors are further configured to execute the computer-executable instructions to:
  determine, using one or more input devices, that the one or more first delivery vehicles are outside of the loading area;
  send, using the one or more processors and to one or more second output devices associated with the queuing area, a signal to indicate for one or more second delivery vehicles in the queuing area to traverse into the loading area from the queuing area; and
  provide, using the one or more second output devices, the indication for the one or more second delivery vehicles to traverse into the loading area from the queuing area.

17. The system of claim 13, wherein determine that the one or more first delivery vehicles have been loaded with packages from the delivery station further comprises:
  determine, based on data captured by a sensor of the one or more first delivery vehicles, that a door of the one or more first delivery vehicles has closed.

18. The system of claim 13, wherein determine that the one or more first delivery vehicles have been loaded with packages from the delivery station further comprises:
  receive, from at least one of one or more mobile devices associated with one or more delivery drivers of the one or more first delivery vehicles and on or more sensors associated with the one or more first delivery vehicles, an indication that the one or more first delivery vehicles have been loaded with packages.

19. The system of claim 13, wherein the one or more first input devices include one or more cameras, and wherein determine that the one or more first delivery vehicles have been loaded with packages from the delivery station further comprises:
  analyze the information using computer vision.

20. The system of claim 13, wherein the one or more processors are further configured to execute the computer-executable instructions to:
  determine that a door of a delivery vehicle of the one or more first delivery vehicles is open; and
  send an instruction to the delivery vehicle to close the door.

* * * * *